United States Patent [19]

Dedole

[11] Patent Number: 4,699,240

[45] Date of Patent: Oct. 13, 1987

[54] DEVICE FOR APPLYING PULSED RADIAL STRESSES TO THE WALL OF A WELL

[75] Inventor: Pascal Dedole, Rueil Malmaison, France

[73] Assignee: Institut Francais du Petrole, Rueil-Malmaison, France

[21] Appl. No.: 729,416

[22] Filed: May 1, 1985

[30] Foreign Application Priority Data

May 2, 1984 [FR] France .................................. 84 06922

[51] Int. Cl.$^4$ ............................................. G01V 1/00
[52] U.S. Cl. .................................... 181/113; 181/106; 181/119; 367/911
[58] Field of Search .......................... 73/151; 166/212; 181/102, 103, 104, 105, 106, 113, 114, 118, 119, 120, 139, 142; 367/25, 31, 35, 75, 86, 142, 143, 911, 912

[56] References Cited

U.S. PATENT DOCUMENTS

| | | | |
|---|---|---|---|
| 3,221,833 | 12/1965 | Malmberg | 367/142 X |
| 3,354,983 | 11/1967 | Erickson | 367/31 X |
| 3,718,205 | 2/1973 | Fair et al. | 367/189 |
| 3,777,814 | 12/1973 | Gustavson et al. | 73/151 |
| 4,252,210 | 2/1981 | Sodich | 181/119 |
| 4,380,806 | 4/1983 | Waters et al. | 367/31 |
| 4,394,754 | 7/1983 | Waters | 367/75 |
| 4,569,412 | 2/1986 | Bouyoucos | 367/911 |

*Primary Examiner*—Deborah L. Kyle
*Assistant Examiner*—Brian S. Steinberger
*Attorney, Agent, or Firm*—Antonelli, Terry & Wands

[57] ABSTRACT

A device for generating pulsed radial stresses to the wall of a well by application of pulses to anchorage shoes of a body lowered in the well, at the end of a cable provided with electric power supply and signal transmission lines. The device comprises hydraulic jacks for controlling the anchorage shoes, a main hydraulic system comprising an accumulator for placing the anchorage shoes in contact with the wall of the well and an auxiliary hydraulic system comprising an accumulator for applying short pulsed radial stresses to the anchorage shoes in the anchorage position. The hydraulic systems are electrically supplied through the cable.

5 Claims, 5 Drawing Figures

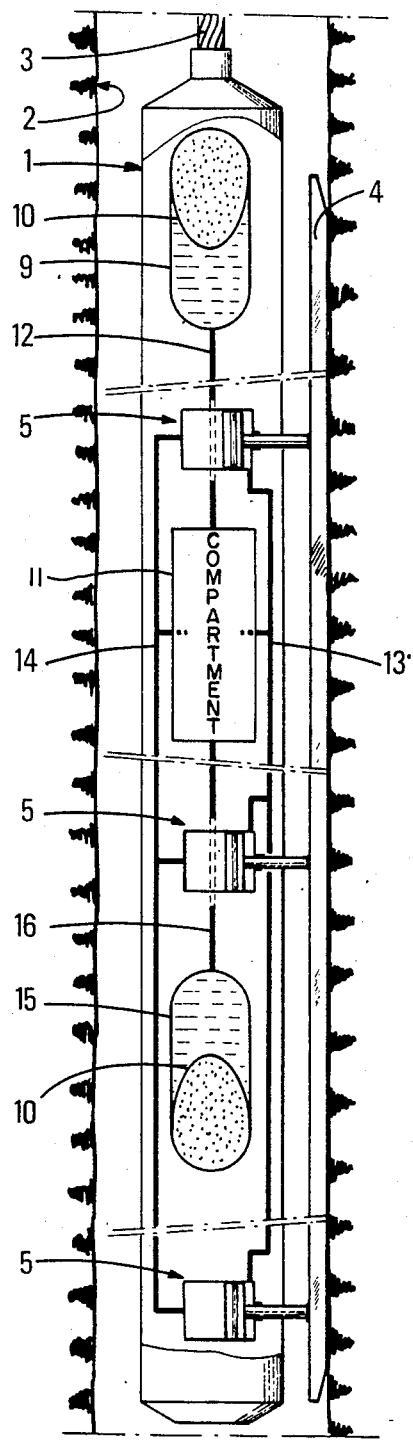
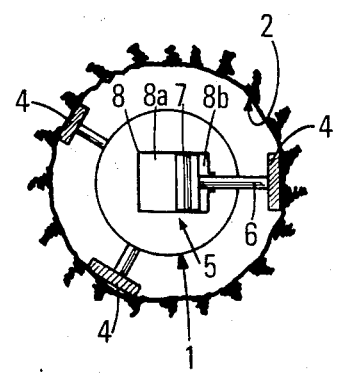

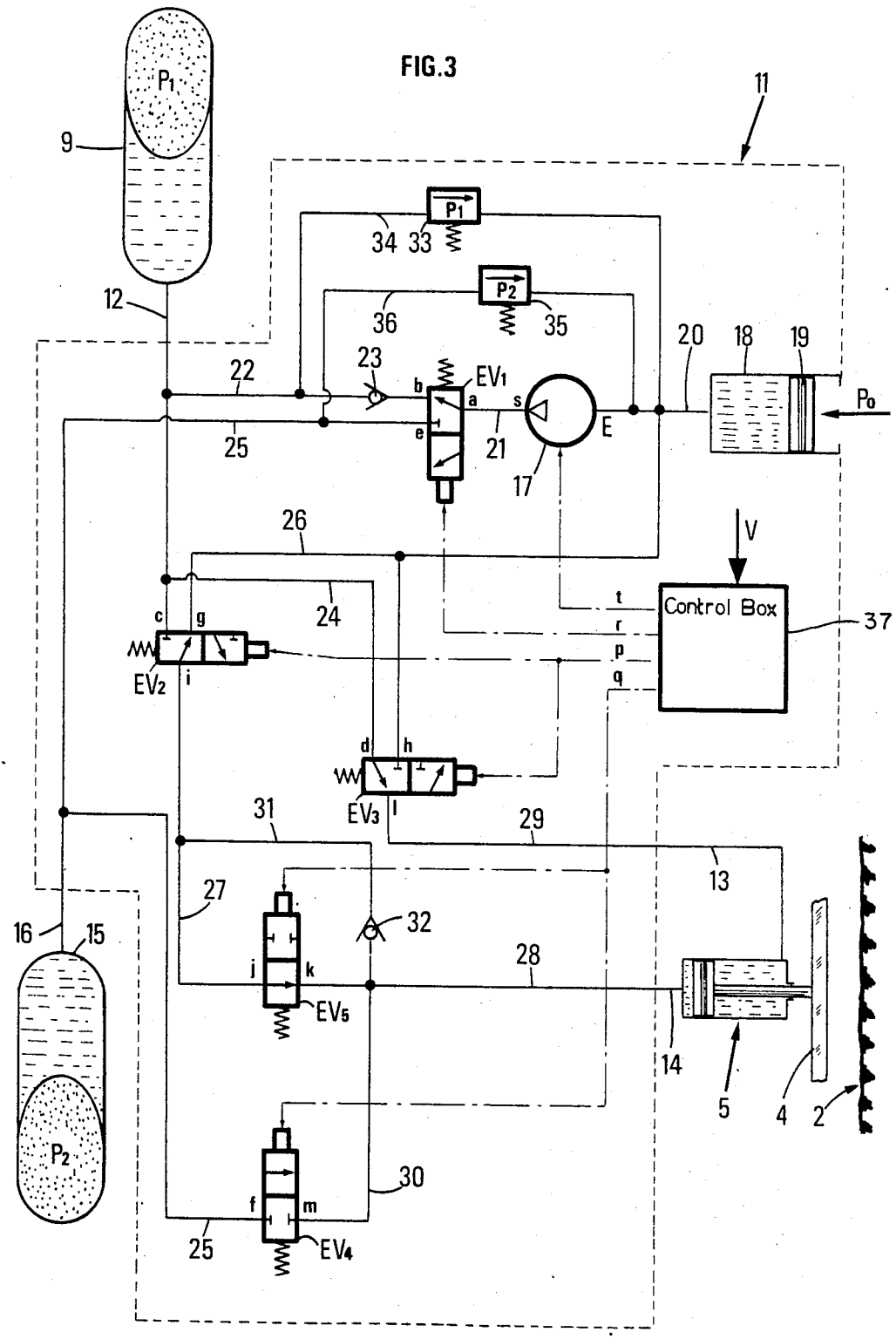

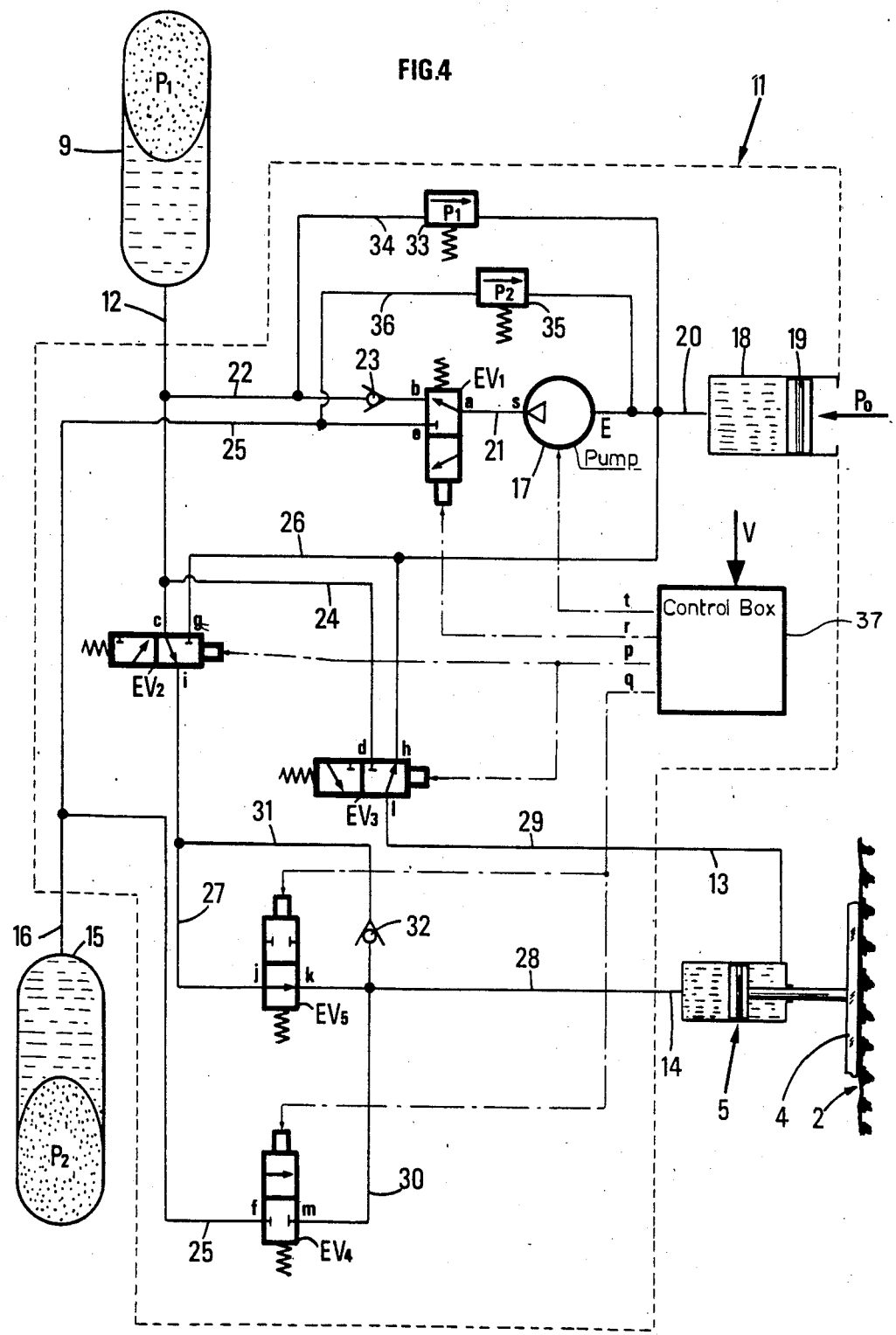

DEVICE FOR APPLYING PULSED RADIAL STRESSES TO THE WALL OF A WELL

BACKGROUND OF THE INVENTION

The present invention relates to a device for applying pulsed radial stresses to the wall of a well and, more particularly to an emitting device adapted to be lowered to a certain depth in a well drilled in the ground for generating seismic pulses.

A source of pulses for wells has a number of advantages. Using such a source, seismic prospection operations may be carried out from well to well which allow a high resolution power to be obtained or else oblique seismic profiles to be rapidly plotted by picking up the emitted waves by means of a plurality of receivers disposed on the surface.

It is moreover more efficient than a source disposed on the surface. An appreciable part of the acoustic energy produced by this latter is in effect emitted under the form of unusable surface waves or Rayleigh waves and the part of this energy which is emitted in the form of P or S type waves is considerably attenuated by the surface layer or weathered zone. The P or S wave energy yield of a well source emitting under the layer is therefore much higher.

Among conventional well sources may be mentioned those which use solid explosives or explosive gas mixtures of the type proposed in, for example, U.S. Pat. Nos. 3,408,122 and 3,858,167. Such sources produce very powerful seismic pulses but the frequency spectrum of these pulses comprises a considerable portion of high frequencies without practical interest in the seismic prospection field. Moreover, the power of the explosions generally results in damaging the well or in impairing the neighboring regions, so that subsequent repetition of seismic firing at the same positions is difficult.

Seismic pulses may also be generated by air gun type sources of the type proposed in, for example, French Pat. No. 2,311,322, wherein sudden discharges of compressed air are provided inside the well filled with water. Such sources produce powerful acoustic waves but require, for their operation, the use of a compressor or compressed fluid reservoirs which, because of the limited space in the drilled hold, must be installed at the surface and connected to the source through piping.

Another conventional source is proposed in, for example, U.S. Pat. No. 4,207,961, which source is adapted for generating acoustic waves in a well containing water by the sudden ejection of liquid in a direction perpendicular to the axis of the well combined with suction in the opposite radial direction, with these sudden movements of liquid being caused by the movement of a mobile assembly under the action of electromagnetic forces. This proposed source is used, in particular, for emitting S-type waves in a predominate radiation direction parallel to the axis of the well.

In accordance with the invention device is provided which allows very powerful radial stresses to be transmitted to formations surrounding a well. The device comprises a body adapted to be lowered in to a well at the end of the cable provided with electric power supply and signal transmission lines, with the body being connected to at least one anchorage shoe movable between a rest position and an extended position in which the anchorage shoe is applied against the wall of the well, under the action of at least one hydraulic jack actuated by a main hydraulic system disposed in the body and controlled through the cable.

In accordance with further features of the present invention, means are disposed inside the body and also controlled through the cable for applying brief pulsed radial stresses to at least one anchorage shoe, when the anchorage shoe is in abutment against the wall of the well.

Advantageously the means for applying the intermittent radial stresses comprise, for example, an auxiliary hydraulic system communicating intermittently with the control cylinder of the anchorage shoe, so as to discontinuously apply an additional anchorage force to the anchorage shoe.

The device of the invention has a very good energy efficiency to the extent that it operates by application of short pulses to one or preferably more anchorage shoes already anchored against the walls. Its P type wave directional diagram is not very directional when compared with that of seismic sources of the tangential type, which makes it particularly well adapted to the seisimic prospection from well to well or to so called reverse vertical seismic prospection in which the emitted waves are picked up by an assembly of receivers disposed on the surface.

Furthermore, since the device is contained in a body which is connected to a surface installation through a single cable providing suspension, electric supply and control thereof, it is adapted for operating over a wide range of depths.

BRIEF DESCRIPTION OF THE DRAWINGS

Other features and advantages of the device of the invention will be clear from following description of a preferred but non limitative embodiment with reference to the accompanying drawings in which:

FIG. 1 is a partial schematic view of the body of the device anchored by application against the wall of the well of anchorage shoes (a single one is shown) under the action of hydraulic cylinders;

FIG. 2 is a top schematic view of the body anchored in a well by three shoes disposed at 120° with respect to each other;

FIG. 3 is a block diagram of the hydraulic system for moving the shoes and applying thereto radial pulses, with electromagnetic valves which this system comprises being positioned so that the shoes are held in a retracted position;

FIG. 4 is a block diagram of the hydraulic system of FIG. 3 in which the electromagnetic valves are positioned for anchoring the shoes against the walls of the well.

DETAILED DESCRIPTION

Figure 5:
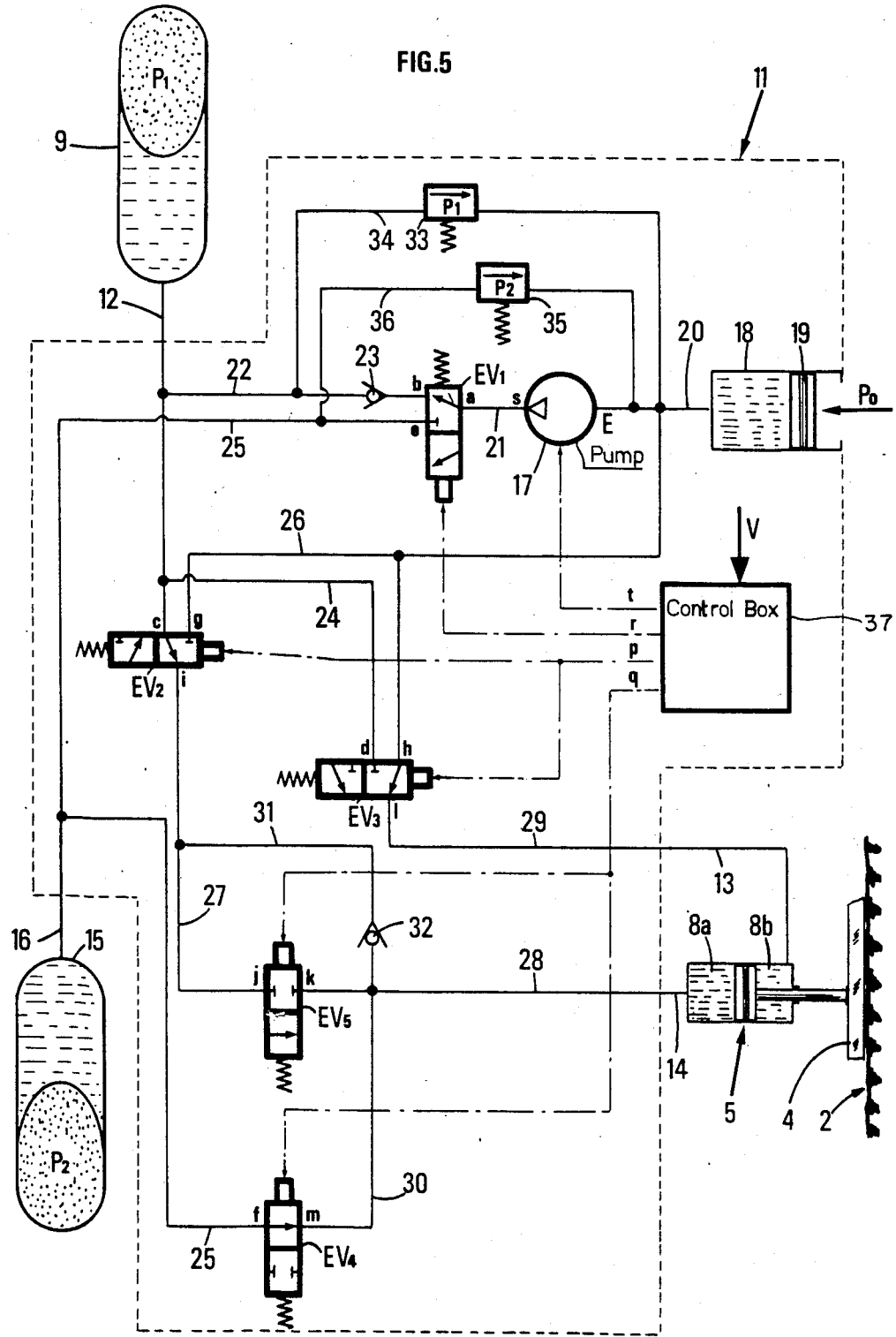
FIG. 5 is a block diagram of the hydraulic system of FIG. 3 in which the electromagnetic valves are positioned so that a radial stress is applied to the shoes already anchored.

Referring now to the drawings wherein like reference numerals are used throughout the various views to designate like parts and, more particularly, to FIG. 1, according to this figure, a device for applying pulsed radial stresses to a wall of a well or bore hole comprises a body 1 adapted to be lowered into a well or borehole 2 at the end of a multifunction cable 3 adapted for supporting the tool and comprising electric power supply conductors and conductors for transmitting control signals from a surface installation to the tool and, in the opposite direction, the transmission to the surface of measurement signals generated by measuring apparatus.

Body 1 is associated with three shoes 4 (FIG. 2) disposed preferably at 120° with respect to each other, which may be moved from a retracted position allowing the probe to move freely in the well to an extended position in which they are applied against the wall of the well under the action of jacks 5.

Each anchorage shoe is associated, for example, with three hydraulic jacks 5 disposed radially and each comprising a rod 6 integral with a piston 7 adapted for sliding in a cylinder 8 under the action of a hydraulic operating system.

This system comprises a conventional oleopneumatic accumulator 9, comprising two chambers respectively filled with pressurized oil and air which are separated by a deformable membrane 10. It also comprises a control assembly contained in a compartment 11 and three ducts, 12, 13, 14 for respectively communicating the control assembly with the oil filled chamber of the accumulator 9, with the chambers $8b$ of the cylinders 8 of the hydraulic jacks 5 the closest to the shoes 4 and with the opposite chamber $8a$ of said cylinders.

A similar accumulator 15 is also disposed in the body 1 and connected to the control assembly by a duct 16. The accumulators 9 and 15 respectively used for anchoring the shoes 4 and applying the pulses to the anchored shoes 4, in a manner described more fully hereinbelow.

The control assembly contained in compartment 11, comprises (FIGS. 3, 4, 5) a hydraulic pump 17, a static pressure compensation cylinder 18 closed at a first end and communicating with the outside of the tool body at its opposite end, inside which freely slides a piston 19. The chamber of cylinder 18 on the closed side thereof is filled with oil which, because of the free sliding of piston 19, is permanently maintained at the pressure or existing in the well, with a duct 20 communicating this chamber with the input E of pump 17.

The output s of the pump communicates, by a duct 21, with an input channel a of a first three-way electromagnetic valve $EV_1$. A duct 22, in which is disposed a non-return valve 23, communicates a first output b of the electromagnetic valve $EV_1$ with one of the channels c of a three-way electromagnetic valve $EV_2$, with a duct 12 coming from the accumulator 9 (FIG. 1) and with a duct 24 connected to a channel d of a three-way electromagnetic valve $EV_3$. The second output channel e of the electromagnetic valve $EV_1$ is connected to a channel f of a fourth two-way electromagnetic valve $EV_4$ by a duct 25 to which is connected duct 16 coming from accumulator 15.

A second channel g of electromagnetic valve $EV_2$ and a second channel h of the electromagnetic valve $EV_3$ communicate through a duct 26 with the duct 20 at the input E of the pump. A duct 27 communicates a third channel i of the electromagnetic $EV_2$ with a channel j of a two-way electromagnetic valve $EV_5$, the other channel k thereof communicating through a duct 28 with the duct 14 (FIG. 1) connecting together the chambers $8a$ of cylinders 5 the furthest away from shoes 4. Duct 13 interconnecting the opposite chamber $8b$ of the same cylinders communicates with a duct 29 connected to the third channel 1 of the electromagnetic valve $EV_3$.

Duct 28 is connected to the second channel m of electromagnetic valve $EV_4$ through a duct 30 and to duct 27 through a duct 31 in which is disposed a non-return valve 32. A first calibrated valve 33, disposed in duct 34 which joins together ducts 22 and 20, limits the difference between the charge pressure $P_1$ of accumulator 9 and the external static pressure $P_0$ to a first predetermined value $\Delta P_1$.

A second calibrated valve 35 disposed in a duct 36 joining together ducts 25 and 20 in the same way, limits the difference between the charge pressure $P_2$ of accumulator 15 and the external static pressure $P_0$ to a second predetermined value $\Delta P_2$ greater than $\Delta P_1$. The electromagnetic valves are actuated by electric signals coming from a control box 37.

The electromagnetic valves $EV_2$, $EV_3$ are actuated simultaneously from the box by an electric line P. Similarly a single line q from box 37 allows the electromagnetic valves $EV_4$, $EV_5$ to be actuated simultaneously. The electromagnetic valve $EV_1$ is actuated separately through a line r coming also from the box.

Box 37 is connected to electric means (not shown) for driving the pump 17 through a supply line t. A line v (not shown) connects it to electric conductors of the multifunction cable 2 (FIG. 1) supporting body 1.

The accumulator 9, the electromagnetic valves $EV_2$, $EV_3$ and the ducts which connects them to the accumulator and to the anchorage actuating jacks 5 form the anchorage means. The auxiliary accumulator 15, the electromagnetic valves $EV_4$, $EV_5$ and the ducts connecting them to the accumulator 15 and to the chamber $8a$ of the anchorage jacks form the means for applying radial stresses. The assembly for pressurizing the accumulators 9 and 15, formed by pump 17, the static pressure compensation cylinder 18, the elctromagnetic valve $EV_1$, valves 33, 35 and the associated ducts is common to the anchorage means and to the radial stress application means.

In the rest position, the electromagnetic valve $EV_1$ causes the ducts 21 and 22 to communicate together, electromagnetic valve $EV_2$ causes ducts 26 and 27 to communicate, electromagnetic valve $EV_3$ causes ducts 24 and 29 to communicate together, electromagnetic valve $EV_4$ isolates ducts 25 and 30 from each other and finally electromagnetic valve $EV_5$ causes ducts 27 and 28 to communicate.

The non-return valve 23 is inserted in duct 22 for preventing the discharge of the accumulator 9 into pump 17, when this latter is stopped. Valve 32 prevents the discharge of accumulator 15 into accumulator 9 through ducts 25, 30, 31 when the electromagnetic valves $EV_2$, $EV_4$ and $EV_5$ are energized.

The hydraulic system is adapted so that, in the rest position of the electromagnetic valves, the chamber $8a$ of each actuating jack the furthest away from each shoe is maintained at the pressure $P_o$ outside body 1, the pressure in the opposite chamber $8b$ which is that of the accumulator 9 being greater than the static pressure, so that no anchorage force is exerted on the anchorage shoes 4.

The device operates in the following manner:

With all the electromagnetic valves in the rest position (FIG. 3), the device is lowered into well 2 from the surface as far as the desired operating depth or is moved thereto from a previous work position.

The pump 17 is started and the accumulator 9 is charged to a predetermined pressure $P_1 = P_0 + \Delta P_1$ fixed by the limitation element or calibrated valve 33. The electromagnetic valve $EV_1$ is then actuated so as to place the channels a and e thereof in communication.

The pressurized fluid delivered by the pump 17 is then used for inflating the accumulator 15 to a predetermined pressure $P_2 = P_0 + \Delta P_2$ fixed by the calibrated valve 35 and, with the accumulator charged, the pump 17 is stopped. The electromagnetic valves $EV_2$, $EV_4$ (FIG. 4) are then simultaneously actuated so as to place the channels c and i in communication on the one hand and h and l on the other. This results in applying the pressure $P_1$ of the accumulator 9 to the chambers 8a of the jacks 5 and the external static pressure $P_0 < P_1$ to the opposite chambers a to b of the same jacks 5. The resultant of the hydraulic force is applied to the rods 6 results in moving the anchorage shoes 4 away from the body 1 and applying the anchorage shoes 4 against the walls of the well.

With the shoes applied against the walls, for the radial stress application means are tripped and for this purpose, an intermittent control signal is applied to the electromagnetic valves $EV_4$, $EV_5$ over the line q so as to place channels f and m in communication and isolate channels j and k from each other for a relatively short time (FIG. 5). Duct 28 and, consequently chamber 8a of the anchorage jacks 5 being placed, through duct 25, in communication with the auxiliary accumulator 15 charged to a pressure $P_2$ much higher than the anchorage pressure $P_1$, a very high over pressure of short duration is applied to jacks 5 and, consequently, to the anchorage shoes 4. The result is that a very narrow radial seismic pulse is transmitted to the surrounding formations.

The tripping cycle may be effected several times at the same position. The seismic recordings, respectively corresponging to the different pulses emitted, are then summed so as to obtain an improved recording.

Retraction of anchorage shoes 4 for moving the device along the well is then effected by bringing the electromagnetic valves $EV_2$, $EV_3$ back to the rest position (FIG. 3).

In the embodiment described above, the radial stress application means are formed by an auxiliary hydraulic system comprising an accumulator and electromagnetic valves connected to the hydraulic anchorage system; however, as can readily be appreciated, without departing from the scope of the invention, the auxiliary hydraulic system may be replaced by any equivalent means capable of applying radial stresses to anchorage shoes already anchored against the wall of the well.

What is claimed is:

1. A device for applying pulsed radial stresses to a wall of a well bore, the device comprising a tool body adapted to be lowered into the well bore at an end of a cable provided with electric power supply and signal transmission lines, at least one anchorage shoe movable between a rest position and an extended position in which the at least one anchorage shoe is applied against the wall of the well bore, at least one hydraulic jack means for moving said at least one anchorage shoe, a main hydraulic means and an auxiliary hydraulic means both disposed in the tool body and controlled through said cable, said main hydraulic means comprising a first accumulator means charged to a pressure greater than a static pressure external to the tool body, and means for distributing hydraulic fluid of the first accumulator means to said at least one hydraulic jack means so as to move said at least one anchorage shoe between said rest position and said extended position, and wherein said auxiliary hydraulic means comprises a second accumulator means charged to a pressure greater than a pressure of the first accumulator means, a pressurized fluid delivery means for charging said first and second accumulator means and valve means for intermittently applying the fluid delivered by said second accumulator means to said at least one hydraulic jack means, in said extended position of said at least one anchorage shoe so as to apply a pulsed radial hydraulic force thereto.

2. A device according to claim 1, further comprising a first electromagnetic valve for placing said pressurized fluid delivery means in communication with said first accumulator means and the second accumulator means, and wherein limitation means are provided for limiting a pressure differential between the respective charge pressures of the two accumulator means and the static pressure external to said tool body to a predetermined value.

3. The device as claimed in claim 2, wherein said limitation means comprises a balancing cylinder with a free piston means for making the lowest pressure of the fluid of the two hydraulic means permanently equal to the static pressure external to the tool body, and hydraulic circuit means comprising calibrated valves.

4. The device as claimed in claim 3, wherein said means for distributing hydraulic fluid comprises a second electromagnetic valve and a third electromagnetic valve, said second electromagnetic valve being associated in series with a fourth electromagnetic valve adapted to be open in the rest position.

5. The device as claimed in claim 4, further comprising a fifth electromagnetic valve closed in a rest position, said fifth electromagnetic valve being disposed in a circuit portion connecting said second accumulator means to said at least one control jack means.

* * * * *